Patented Mar. 16, 1948

2,438,021

UNITED STATES PATENT OFFICE 2,438,021

ETHYLENE-POLYHALOETHYLENE REACTION PRODUCTS

John Richard Roland, Wilmington, Del., assignor to E. I. du Pont de Nemours & Company, Wilmington, Del., a corporation of Delaware No Drawing. Application August 12, 1943, Serial No. 498,425

10 Claims. (Cl. 260—654)

This invention relates to new halogen-containing organic chemical products and to a process for preparing the same.

The process of the present invention involves the reaction of "telomerization," i. e., the reaction wherein a plurality of molecules of a "taxogen," i. e., a polymerizable ethylenically unsaturated organic compound is reacted under polymerizing conditions with one molecule of a "telogen" YZ to form a "telomer," i. e., a compound of the formula $$Y-(A)_n-Z$$

wherein $-(A)_n-$ is a divalent radical formed by the union, with the formation of new carbon carbon bonds, of a plurality of molecules of the taxogen, the unit A being termed a "taxomon," $n$ is a plural integer, and Y and Z are fragments of the telogen attached terminally to the taxomon chain. This novel reaction of "telomerization" herein referred to is more completely described in copending application Serial No. 438,466, filed April 10, 1942. The "telomer" is thus an addition product of a plurality, e. g., from 2 to 100, of molecules of the taxogen and one molecule of the telogen.

This invention has as an object the preparation of new telomers. Another object is the preparation of new solvents, plasticizers, wax substitutes, heat transfer media, etc. Other objects will appear hereinafter.

These objects are accomplished by the following invention wherein an aliphatic, including cycloaliphatic, halogen-containing organic compound not polymerized to a polymer of ten or more units when heated at 50–100° C. in the presence of a peroxide catalyst and which contains a multiple (double or triple) bond between carbons is reacted in the presence of an agent which is a catalyst for the polymerization of ethylene and a non-catalyst for the Friedel-Crafts reaction at 25–300° C. with ethylene.

In carrying out the telomerization of ethylene with a non-polymerizable halogenated unsaturated telogen, e. g., tetrachloroethylene, the process is preferably conducted at superatmospheric pressure, and pressure apparatus must accordingly be employed. The apparatus consists, in its essential parts, of a pressure reactor capable of being heated, and equipped with means of agitating the reactants, with an inlet tube for admitting gaseous ethylene, a vent connected to a safety rupture disc, and a pressure gage. The liquid charge which is placed in the reactor consists of telogen, water, and/or inert organic solvent, such as iso-octane, dioxane, cyclohexane, etc., and catalyst, of which the latter is preferably a diacyl peroxide or an alkali metal-, alkaline-earth metal-, or ammonium persulfate and is generally employed in the amount of about 1/100 of an equivalent, based on the quantity of telogen employed. The reactor is then closed, the contents are agitated by suitable means such as by stirring with an internal stirrer or by agitating the reactor, and ethylene under pressure is admitted. The amount of ethylene so employed is regulated so that the desired pressure will be achieved at reaction temperature, which is preferably about 50–130° C. The pressure range 20–200 atmospheres is preferred, the exact pressure employed depending somewhat upon the reactants used and upon the average molecular weight of telomer desired. In general, the use of lower pressures or higher temperatures gives lower molecular weight products. Similarly, under equivalent conditions, more active telogens also lead to products having a shorter average chain length.

Depending upon the catalyst and the conditions used, for example, with the preferred peroxide catalysts at about 50–130° C., the telomerization reaction sets in, as is indicated by a drop in pressure registered on the gage attached to the reactor. As an example of the dependency of the temperature upon the catalyst, persulfates and diacyl peroxides are usually used at 50–150° C., while such catalysts as oxygen and hydrazine compounds require higher temperatures, e. g., 130–300° C. or higher. It is preferable, although not essential, to maintain the desired reaction pressure by admitting additional ethylene from a storage cylinder or by injecting liquid ethylene, liquid telogen, water, or a mixture of ethylene and telogen as the reaction proceeds. If inadequate agitation is employed, the reaction may be accompanied by a marked temperature rise in the reaction mixture. The use of insufficient water in the reaction mixture may also occasion such a temperature rise. Indeed, in certain instances, especially when water has been omitted entirely from the reaction mixture, telomerization has been found to proceed with explosive violence. To avoid this, at least one-sixth as much water as telogen, and in many cases an equal weight of water, is preferably employed except in those cases where the telogen is water sensitive. Because of its high specific heat, water serves as an excellent heat dissipating medium. When water-sensitive telogens are employed, an organic diluent which is relatively inert with respect to the telogen is preferably employed.

The end of the reaction is indicated by the cessation of ethylene absorption. When this point is reached, the reaction mixture is allowed to cool, removed from the reactor, and worked up to isolate the resulting telomer. As a general rule, the telogen is used in excess and a considerable proportion of it remains at the end of the reaction. If the telogen happens to be a water-immiscible liquid, the telomer is generally soluble in it and may be isolated by separating the water from the reaction mixture and evaporating the more volatile telogen from the less volatile telomer.

It must be emphasized that in all cases the telomer produced by this reaction is not a single molecular species but is a mixture of structurally homologous compounds differing from one another by one or more ethylene units. For example, when ethylene is telomerized with tetrachloroethylene, a mixture of compounds of the formula $$Cl(CH_2CH_2)_nCCl=CCl_2$$

where $n$ is an integer is obtained. These telomers are liquid to wax-like in character, depending on the average chain length of the products. For example, the products in general are liquids when the average number of ethylene units in the telomer is small, while the higher molecular weight telomers, which may have as many as 100 ethylene units, are waxes.

The lower molecular weight constituents of such telomer mixtures may often be separated as pure organic compounds by fractional distillation. This process is applicable to all telomer mixtures which can be distilled without decomposition. The process is particularly simple because the various constituents of the mixture differ from each other by at least two carbon atoms, and thus have fairly large differences in boiling points.

Many telomer mixtures are not amenable to distillation and in such cases it is generally not feasible to separate the mixture into its constituents. For a great many applications, however, the telomer mixture can be employed per se, since it is a mixture of functionally identical compounds differing from one another only in the number of ethylene groups in the chain between the functional groups.

It is a very important feature of the telomerization reaction that it produces a structurally homologous mixture of compounds; structural isomers are not formed. This means that a telomer mixture reacts essentially as a pure compound and can be employed as such for many purposes.

For a given telogen the average chain length of the telomer mixture depends on the relative concentrations of ethylene and telogen. Accordingly, when telomers of relatively long chain length are desired, the concentration of the ethylene relative to that of the telogen may be increased, for example, by increasing its pressure in the reaction mixture or by employing an inert diluent. The average chain length of the telomer mixture is also a function of the telogen employed.

In some telomerizations, a portion of the product consists of the 1:1 addition compound of telogen to ethylene. The addition of such compounds to ethylenic double bonds is distinct from telomerization, in which at least two units of ethylene participate, but such by-products are often formed in telomerizations.

The more detailed practice of the invention is illustrated by the following examples, wherein parts given are by weight. There are, of course, many forms of the invention other than these specific embodiments.

*Example I*

A high pressure reactor was charged with 100 parts of water, 100 parts of tetrachloroethylene, 0.41 part of benzoyl peroxide. The reactor was then closed, pressured with ethylene, and heated to 115° C. under 95 atmospheres pressure of ethylene for five hours. The mixture was then cooled, washed with water, dried and distilled. After the recovery of unreacted tetrachloroethylene, and a slight foreshot, there was obtained a pure compound boiling at 99° to 103° under ten mm. pressure. This compound, $$Cl(CH_2)_4CCl=CCl_2$$

had the following constants:

Chlorine, 63.42%; $D_4^{25}$, 1.3456; $n_D^{25}$, 1.5060; Mr, 49.02.

The calculated values were:

Chlorine, 63.96%; Mr, 48.89.

The material remaining in the still consisted of higher boiling telomers of the formula $$Cl(CH_2CH_2)_nCCl=CCl_2$$

wherein $n$ is an integer greater than 2.

*Example II*

A high pressure reactor was charged with 180 parts of water, 20 parts of trichloroethylene, 4 parts of sodium acetoxyoctadecanesulfonate, and 0.6 part of benzoyl peroxide. The reactor was closed, pressured with ethylene, and heated at 89° to 93° C. under an ethylene pressure of 850 to 1005 atmospheres for ten hours. A total pressure drop of 688 atmospheres was observed in this pressure range. The reaction mixture was cooled, the reactor opened, the product discharged and steam distilled to remove unreacted trichloroethylene, and the resulting hard wax was dried. The resulting wax contained 23.16% chlorine, indicating a mixture of telomers, each with one trichloroethylene unit and an average of 11.75 ethylene units.

*Example III*

A high pressure reactor was charged with 160 parts of water, 40 parts of tetrachloroethylene, two parts of sodium acetoxyoctadecanesulfonate, and 0.2 part of benzoyl peroxide. The mixture was pressured with ethylene and the reaction carried out as in Example II. The resulting greasy wax contained 17.25% chlorine, indicating an ethylene/tetrachloroethylene telomer mixture having each one tetrachloroethylene unit and an average of 23.5 ethylene units.

*Example IV*

A silver-lined high pressure reactor was charged with 50 parts of water, 50 parts of allyl chloride, and 0.5 part of benzoyl peroxide. The reactor was then closed, pressured with ethylene, and heated to a temperature of 100° to 120° C. under an ethylene pressure of 98 to 119 atmospheres for 14.5 hours. The reactor was then cooled, the pressure vented, and the products discharged. After separating the organic layer from the aqueous layer and distilling off unchanged allyl chloride, there was obtained 14 parts of liquid boiling above 100° C. This product was an ethylene/allyl chloride telomer having the elements of the allyl chloride molecule attached to the ends of a polymethylene chain formed by the condensation of a number of ethylene units. The structure of this telomer is represented by the formula $CH_2=CH-CH_2(CH_2-CH_2)_n-Cl$. The product contained chlorine and was unsaturated.

The telomerization process of the present invention is applicable to ethylene. Telomers produced therefrom are unbranched hydrocarbon derivatives, which, in general, are more useful than the branched chain telomers.

The telomerization process of this invention can be applied not only to compositions wherein ethylene is the only oxygen or peroxy compound catalyzed polymerizable material but also to other compositions containing, in addition to ethylene one or more additional materials which are known to be copolymerizable with ethylene with the aid of oxygen, peroxides, persalts and other similar catalysts, which generally contain two directly linked oxygen atoms. This invention is generic to the telomerization of a so copolymerizable monomer with ethylene in the process of this invention, including styrene and similar monoolefinic hydrocarbons; vinyl esters, e. g., vinyl chloride, vinyl acetate, vinyl formate, and vinyl isobutyrate; alpha ethylenically unsaturated acids, e. g., acrylic, methacrylic, itaconic, citraconic, crotonic, maleic, and fumaric acids and their esters, nitriles, acid halides, and anhydrides; vinylidine chloride; N-vinyl imides, e. g., N-vinylphthalimide and N-vinylsuccinimide; vinyl ethers, e. g., methyl vinyl ether; vinyl acetals, e. g., divinylformal and divinylbutyral; vinyl ketones, e. g., methyl vinyl ketone; etc. The telomerization process of this invention is thus applicable to the telomerization of ethylene with or without the admixture of other ethylenically unsaturated material likewise polymerizable by oxygen and peroxy catalysts.

The process of this invention is generic to the use, as a telogen, of a halogenated organic compound which has a plural (double or triple) bond and which is non-polymerizable, i. e., is not converted to a polymer containing at least ten units of the monomer when heated at 50–100° C. in the presence of a peroxy catalyst such as benzoyl peroxide. Compounds having more than one halogen atom per molecule, especially those compounds containing more than one halogen atom on a single carbon atom are preferred. In general such compounds telomerize more readily with ethylene and give rise to products in a lower molecular weight range, which are in general more useful products. Halogenated ethylenes having at least three halogens of atomic weight above thirty are particularly useful.

Suitable telogens include methallyl chloride, crotyl chloride, 1-chlorobutene-3, hexachloropropene, 1,1,2,3-tetrachloro-3,3-difluoropropene-1, 1,1,1 - trichloropropene-2,1,1,2-trichloropropene-1, 1,1,5-trichloropentene-1, tetrabromoethylene, tribromoethylene, tetraiodoethylene, dibromostilbene, dichlorocyclohexene, dibromocyclopentene, and dichloropropene.

Any telomerization catalyst may be employed in the process of the present invention including catalysts having oxygen atoms directly linked, e. g., oxygen, peroxygen compounds, including diacyl peroxides, e. g., acetyl peroxide, propionyl peroxide, benzoyl peroxide, and lauroyl peroxide; dialkyl peroxides, e. g., diethyl peroxide, alkali metal, alkaline earth metal, and ammonium persulfates, perborates, and percarbonates, e. g., sodium, potassium, calcium, and ammonium persulfates, sodium perborate, potassium percarbonate, other peroxides such as hydrogen peroxide, ascaridole, tetrahydronaphthalene peroxide, cyclohexanone peroxide, and diethyl perdicarbonate; metal alkyls, e. g. tetraethyl lead, tetramethyl lead, tetraphenyl lead, mercury dialkyls, tetraphenyl tin; and ultraviolet light, preferably in the presence of such photo-sensitizers as mercury, alkyl iodides, and acetone. These catalysts are known catalysts for ethylene polymerization and non-catalytic in the Friedel-Crafts reaction. The preferred catalysts are compounds having two directly linked oxygen atoms, e. g., oxygen, the diacyl peroxides, the dialkyl peroxides and the alkali metal and ammonium persulfates. To be effective as a catalyst, molecular oxygen should be present in small quantity, such as for example less than 1000 P. P. M. As is the case in vinyl polymerizations, oxygen in larger quantities than this generally acts as an inhibitor for the reaction. Telomerization catalysts have been described in copending application Serial No. 438,466, filed April 10, 1942.

Telomerization may be carried out over a wide range of temperatures, from room temperature to over 300°. In fact, the upper temperature limit for telomerization is determined only by the thermal stability of the various compounds in the reacting system. The preferred temperature for any given telomerization depends primarily on the catalyst and the telogen being employed. For the majority of cases the preferred reaction temperature lies in the range 25–150°. The preferred catalysts, such as the diacyl peroxides and the persulfates, are generally employed in this temperature range, and the preferred classes of telogens, such as polyhalogenated ethylene, propylene, and butylene in which the halogen has an atomic weight of more than thirty, react satisfactorily under such conditions. High temperatures are generally employed only with less active telogens and catalysts which are more heat-stable than those of the preferred class. Such telogens as the polyhalides which have a plurality of halogens on one carbon are in general more reactive than the monohalides, especially the monochlorides. Thus, tetrachloroethylene, trichloroethylene, tetrachloropropylene, and hexachloropropylene are more reactive than allyl chloride, or 1,2-dichloroethylene. Similarly, catalysts such as oxygen and hydrazine are more heat-stable and thus require higher temperatures than diacyl peroxides to initiate the telomerization reaction. Telomerizations with less active catalysts and telogens may require temperatures of the order of 150–300° although high temperature telomerizations are usually less preferred.

Superatmospheric pressure is generally desirable for the telomerization reaction. This is particularly true in the present invention since ethylene is a gas, and it is preferable to maintain superatmospheric pressure in order to achieve an appreciable concentration of this reactant in the system. This is not absolutely essential, however, and telomerization can be carried out at atmospheric pressure. On the other hand, successful reactions have been run at as high as 1000 atmospheres pressure, and the ultimate pressure limit for the reaction is only that which the equipment available will stand. The preferred pressure range for the majority of telomerizations is 20–200 atmospheres, but the invention is not limited to this range, since generally the effect of pressure is only to alter the average chain length of the telomer produced in a given system.

It must be emphasized that with ethylene, which is a gas, the average chain length of the telomer is a function of the concentration of ethylene which is maintained in the reaction system, and that this, in turn, is dependent on the reaction pressure and liquid to gas ratio. Moreover, the average chain length of the telomer in a given reaction also depends on the nature of the telogen employed, some telogens being more active than others. In the final analysis the reaction pressure to be employed for a given system depends upon the chain length of telomer desired and upon the particular telogen which is used. Such conditions when not directly predictable from the examples and explanation given above can usually be determined by a simple preliminary experiment.

Inert solvents may be employed, sometimes to advantage, in telomerization systems. An inert solvent, such as isooctane, serves the same purpose as increased pressure in increasing the average chain length of a given telomer for a given reaction system. That is, it is possible by use of an inert solvent which is a solvent for ethylene, to increase the relative concentration of ethylene with respect to telogen, and thereby to effect the same result as is brought about by an increase in pressure. As solvent there are preferably employed relatively low boiling liquids which are relatively inert with respect to the telogen and which are not halogenated aliphatic unsaturated telogens. The telogens of this invention react so much more readily than ethers, esters, and acetals, that for the purpose of this invention ethers, esters and acetals may be considered inert. Therefore suitable inert solvents include aliphatic hydrocarbons, cycloaliphatic hydrocarbons, aliphatic ethers, and cycloaliphatic ethers, such as dioxan. Aromatic hydrocarbons are also operable.

The use of a surface-active agent, such as has been described in certain of the examples, to aid in the dispersion of the reactants in the aqueous system is optional. While such an agent is desirable in some cases, such as to obtain dispersions for textile impregnation, in general it is unnecessary, and may lead to less pure products.

The ethylene-tetrachloroethylene telomerization, in an unbuffered system, generally becomes more acidic as the reaction progresses. However, it is possible, by the use of a buffer such as sodium bicarbonate, to maintain an alkaline pH during the entire reaction without any effect on the course of the reaction. Certain pH-sensitive telogens, of course, may require a buffered system.

Although, as has been mentioned above, oxygen in small concentrations may, in the absence of other agents, act as catalyst for the telomerization, its presence in larger quantities is to be scrupulously avoided. This is in agreement with the now generally accepted fact that, in any vinyl-type polymerization, oxygen in appreciable quantities has a deleterious effect not only upon yield but in many cases upon the quality of the product produced. Likewise, in telomerizations, the oxygen content of the reaction system is preferably kept to a practical minimum, i. e., not more than 1000 parts per million based on the polymerizable ethylenically unsaturated hydrocarbon employed.

The reaction may be carried out in any kind of pressure equipment made of, or lined with, materials capable of withstanding moderate corrosive attack. Such lining materials as stainless steel, silver, and aluminum are particularly useful, although chrom-vanadium steel can be used. Many other corrosion resistant alloys are of course applicable.

It is sometimes desirable to add one or both of the reactants to the system as the reaction progresses. This may be done by injection of the vapor or liquid into the reaction system by well-known means. It is also feasible to add a catalyst to the system as the reaction progresses. This may be accomplished, for example, by injecting a solution of the catalyst in one of the reactants or in an inert solvent. This procedure is especially advantageous in those cases where the reaction takes place very rapidly. In such instances, portion-wise or slow-continuous addition of the catalyst to the system facilitates the control of the reaction and generally leads to higher yields.

It is within the scope of this invention to carry out telomerization reactions in a continuous system and from which the products can be removed continuously. For example, a mixture of reactants and catalyst can be passed continuously through a zone which is under telomerization conditions. Alternatively, the catalyst can be injected into the system which is passing through the reaction zone. In some cases, advantage may be derived by adding one of the reactants to the mixture in the reaction zone. This is especially true when the reaction is so rapid as to cause a marked change in concentration in one of the reactants. Continuous operation possesses many technical advantages such as economy of operation, accurate control of the reaction, a constant ratio of reactants at all times, and flexibility of operation.

The products of this invention stemming as they do from a number of taxogens and telegens and having from 2 to 100 olefin units have a wide field of usefulness. The mixture of low molecular weight chlorinated hydrocarbons produced by the telomerization of ethylene and tetrachloroethylene or trichloroethylene can be used as a solvent, e. g., for degreasing operations, a heat transfer medium, and in some cases as a plasticizer, e. g., for vinyl and vinylidene polymers. The higher molecular weight waxy products of up to 100 ethylene units produced at higher olefine pressures, or from other telogens such as chlorocyclohexene can be used as wax substitutes, coating materials, lubricating oil adjuvants, bullet lubricants, polish ingredients, in rubber compounding, antiflooding agents, anti-tack agents in calendaring plastics, etc. Again, the low molecular weight telomers may be separated into their individual components by fractional distillation, and these are very useful as intermediates for a wide variety of syntheses.

The above description and examples are intended to be illustrative only. Any modification of or variation therefrom which conforms to the spirit of the invention is intended to be included within the scope of the claims.

What is claimed is:
1. The compound

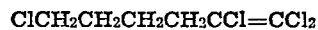

$ClCH_2CH_2CH_2CH_2CCl=CCl_2$

2. A liquid to waxy mixture of ethylene-tetrachloroethylene compounds of the formula

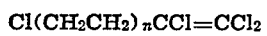

$Cl(CH_2CH_2)_nCCl=CCl_2$ wherein $n$ is 2 to 100, said mixture being obtained by the process of claim 6.

3. A mixture of compounds of ethylene and a chlorinated ethylene containing at least three chlorine atoms said mixture being obtained by the process of claim 9 and the compounds of said mixture containing a chain of two to one hundred ethylene units, a terminal valence of the chain being satisfied by a chlorine radical and other terminal valence of the chain being satisfied by the radical obtained by removing a chlorine atom from the chlorinated ethylene.

4. A mixture of compounds of ethylene and a halogenated ethylene containing at least three halogen atoms of atomic weight greater than 30 said mixture being obtained by the process of claim 7 and the compounds of said mixture containing a chain of two to one hundred ethylene units, a terminal valence of the chain being satisfied by a halogen atom of atomic weight greater than 30 and the other terminal valence of the chain being satisfied by the radical obtained by removing a halogen atom from the halogenated ethylene.

5. Process of forming compounds of the formula $$Cl(CH_2CH_2)_nCCl=CCl_2$$

wherein $n$ is 2 to 100 which comprises reacting ethylene at a pressure of 20 to 1000 atmospheres with tetrachloroethylene at 25-150° C. in the presence of benzoyl peroxide.

6. Process of forming compounds of the formula $$Cl(CH_2CH_2)_nCCl=CCl_2$$

wherein $n$ is 2 to 100 which comprises reacting ethylene at a pressure of 20 to 1000 atmospheres with tetrachloroethylene at 25-150° C. in the presence of a catalyst having two directly-linked oxygen atoms.

7. Process of forming compounds of the formula $$X(CH_2CH_2)_nCR=CRR$$

wherein X and two of the R's are halogen of atomic weight greater than 30, the remaining R being selected from the class consisting of hydrogen and halogen of atomic weight greater than 30 which comprises reacting ethylene at a pressure of 20 to 1000 atmospheres with a polyhaloethylene having at least three halogens of atomic weight greater than 30 at 25-150° C. in the presence of a catalyst having two directly linked oxygen atoms.

8. Process of forming compounds of the formula $$Cl(CH_2CH_2)_n-R$$

wherein $n$ is an integer from 2 to 1000 and R is the monovalent radical obtained by removing a chlorine atom from trichloroethylene which comprises reacting ethylene at a pressure of 20 to 1000 atmospheres with trichloroethylene at 25-150° C. in the presence of a catalyst having two directly linked oxygen atoms.

9. A mixture of compounds of one molecule of trichloroethylene with a plurality of molecules of ethylene said mixture being obtained by the process of claim 8.

10. Process of forming compounds having a chain of two to one hundred ethylene units, one terminal valence of the chain being satisfied by a chlorine atom and the other terminal valence of the chain being satisfied by the monovalent radical obtained by removing a chlorine atom from a chlorinated ethylene containing at least three chlorine atoms which comprises reacting ethylene at a pressure of 20 to 1000 atmospheres with said chlorinated ethylene at 25-150° C. in the presence of a catalyst having two directly linked oxygen atoms.

JOHN RICHARD ROLAND.

REFERENCES CITED

The following references are of record in the file of this patent:

UNITED STATES PATENTS

| Number | Name | Date |
|---|---|---|
| 2,200,429 | Perrin et al. | May 14, 1940 |
| 2,325,060 | Ingersoll | July 27, 1943 |
| 2,334,195 | Hopff et al. | Nov. 16, 1943 |
| 2,338,893 | Bauer et al. | Jan. 11, 1944 |
| 2,342,400 | Hopff et al. | Feb. 22, 1944 |

FOREIGN PATENTS

| Number | Country | Date |
|---|---|---|
| 824,909 | France | Feb. 18, 1938 |

OTHER REFERENCES

Prins "Rec. des. Trav. Chim. des Pays Bas," vol. 51, pages 1065-80 (1932); vol. 56, pages 779-84 (1937); vol. 57, pages 659-66 (1938).

Certificate of Correction

Patent No. 2,438,021. March 16, 1948.

JOHN RICHARD ROLAND

It is hereby certified that errors appear in the printed specification of the above numbered patent requiring correction as follows: Column 5, line 68, for the word "telemerization" read *telomerization*; column 6, line 68, for "telomerization" read *telomerizations*; column 9, line 4, claim 3, for the claim reference numeral "9" read *10*; line 7, same claim, insert *the* before "other"; column 10, line 4, claim 8, for the numeral "1000" read *100*; and that the said Letters Patent should be read with these corrections therein that the same may conform to the record of the case in the Patent Office.

Signed and sealed this 18th day of May, A. D. 1948.

[SEAL]

THOMAS F. MURPHY,
*Assistant Commissioner of Patents.*